3,009,775
REDUCTION OF CAKING TENDENCY OF SALT

Kurt Ladenburg, Chappaqua, and Richard S. Ploss, Oceanside, N.Y., assignors to International Salt Company, Inc., Scranton, Pa.
No Drawing. Filed Apr. 14, 1958, Ser. No. 728,490
7 Claims. (Cl. 23—89)

This invention relates to the reduction of the caking tendency of salt (sodium chloride), and more particularly to compositions for reducing the caking tendency of salt, to salt compositions having a reduced tendency to cake, and to processes for producing such compositions.

The tendency of salt in particulate form to cake under varying atmospheric conditions is well known and many expedients have been devised and tried in attempts to reduce or eliminate such tendency. This caking problem is always present to a greater or lesser degree regardless of the size, shape, number, or purity of the salt particles under consideration. Thus, such particles may be in the form of powder, flakes, granules, crystals, commercial rock salt or the like, in loose bulk in small or large amounts up to several tons or more, or in flexible or rigid containers.

The caking problem is particularly serious in the case of industrial usages of salt requiring bulk purchases and transport and storage of the salt. For example, when rock salt is shipped or stored in outdoor piles or in open air sheds or even in closed areas, the normally changing temperature and/or humidity conditions tend to cause the salt to cake, harden or freeze progressively inwardly from the covering layer thereof, so that in a relatively short time the interior of the salt pile is rendered substantially inaccessible such as by ordinary hand shoveling operations or the like. Then, in order to make use of the salt, the pile must be broken into by use of a pickaxe or other drastic means, followed often by a further breaking down or grinding of the resulting large aggregates or lumps to the original particle size. Such operations are obviously troublesome and expensive.

Caking is apparently the result of alternate sorption and evaporation of water from the salt particles as the partial pressure of water vapor in the atmosphere rises above and falls below the vapor pressure of a saturated solution of the salt. The water sorbed on the surface of each salt particle forms a surface film of saturated sodium chloride solution which collects by capillary action at each point of contact between adjacent particles of salt. This liquid bridge becomes a solid crystalline bridge when the contained water has evaporated, and the particles of salt are thus "welded" together. Under freezing temperatures the condition is due to formation of "welded" bridges of salt or sodium chloride dihydrate or eutectic, or complex solid combinations of any two or all three of these depending upon the temperature.

The above-described caking tendency of salt is also present when it is used as an anti-freezing or anti-caking additive in piles of granular materials such as coal, ore, limestone, gravel, sand, clay, and other rock-like or earth-like materials or the like subject to rainfall, snow, freezing temperatures and other changing atmospheric influences in storage or transit.

A recently employed solution of the salt caking problem involves addition of an alkali metal or alkaline earth metal ferrocyanide to the particulate salt composition in proportions of about ⅛ to 8 pounds per ton of salt. The ferrocyanide may be applied in the form of particles of approximately the same size or smaller than the salt particles, or in the form of an aqueous solution, or spray, over the surface of the pile or intimately mixed therein or both. This additive substance apparently prevents caking of the salt by causing the salt to effloresce and develop a fragnible powdery, fluffy, or flaky "insulation" mass in the areas adjacent the points of contact between the salt particles, thereby preventing the building of weldments of solid crystalline salt therebetween, or in some other manner or mechanism as yet not fully understood or explained.

While the expedient described in the foregoing paragraph is a notable advance in arriving at a complete solution to the caking problem, it has been found in practice to be subject to a more or less serious disadvantage arising from the very same characteristics which render its use so desirable, namely the relatively high water solubility of the said ferrocyanides and the small amounts thereof necessary to counteract the caking tendency of the salt. Such disadvantage is constituted by the relatively rapid leaching of such additives from the salt pile under atmospheric conditions, particularly rain, whereby the desired protection against caking is lost. This loss of protection may cause great damage and expense, and the alternative of carrying out another treatment with the additive is also, albeit less, undesirable from a commercial and practical point of view.

It is an object of this invention to provide a solution to the caking problem of salt which is not subject to the aforesaid disadvantage. Another object of this invention is the provision of means for reducing or eliminating the caking tendency of salt including the use of the ammonium, alkali metal and alkaline earth metal ferrocyanides which will not be subject to the aforesaid disadvantage. Other objects and advantages will appear as the description proceeds.

Initial attempts to carry out the above objects were influenced by the reasoning that said ferrocyanides were apparently operative because of their solubility in the brine formed on the surfaces of the salt particles, whereby any reduction in such solubility by application of water insoluble materials would be expected, pro tanto, to reduce their effectiveness in preventing caking. Admixtures of the additive with such water soluble substances as polyvinylpyrrolidone, carboxymethyl cellulose, starch, glue, gelatine, gelatine plus alum, and a powdered dispersant (Blancol, General Aniline & Film Corp.) were, however, found to have little or no greater resistance to leaching in admixture with particulate salt. Admixtures of the additive with such water insoluble substances as powdered stearic acid and paraffin were likewise found to provide no solution to the problem.

The attainment of the above objects is made possible by the surprising discovery that particles of ammonium, alkali metal and alkaline earth metal ferrocyanides provided with a coating of about 0.5 to 6% of a water insoluble waxy material by weight of the said particles have a much lower leaching rate and yet are still highly effective additives for reducing caking in particulate salt compositions. Lower proportions of the waxy material may be employed but without a sufficiently worthwhile decrease in leaching rate, while higher proportions of the waxy material render the additive increasingly ineffective for providing the desired degree of protection against caking of the salt.

The instant invention accordingly includes the provision of a composition comprising a compound selected from the group consisting of the ammonium, alkali metal and alkaline earth metal ferrocyanides in particulate form coated with about 0.5 to 6% by weight of a water insoluble waxy material, and of a process for producing such composition. Also included in the invention is the provision of a salt composition in particulate form containing admixed therein an amount of a particulate wax-coated compound as defined above sufficient to reduce the tendency of the salt to cake, and of a process for producing such salt composition.

While all the ammonium, alkali metal and alkaline earth metal ferrocyanides are effective anti-caking agents, those more readily available are preferred, such as the ammonium, potassium, calcium, and sodium salts. Of these, sodium ferrocyanide is not preferred in combining both economy and effectiveness. The crystals of these salts contain water of crystallization, and care should be taken during the coating operation to prevent this water from being driven off and thereby changing the crystalline structure. The particles of anti-caking agent may have a size smaller than that of the salt particles, but particles which are too small (e.g. those passing a #325 mesh screen) do not lend themselves so readily to the required coating treatment although they are still operative. All presently available ferrocyanide compositions are acceptable. Use of a size of the same order as that of the salt particles is particularly advantageous in minimizing any tendency of the agent to settle or segregate in the salt composition being treated.

As stated above, the ferrocyanide particles must be coated with about 0.5 to 6% of a water-insoluble material having a waxy consistency under ambient atmospheric conditions. Paraffin wax is preferred because of its desirable physical properties, inertness with respect to the particles of ferrocyanide and salt, and economy. Animal and vegetable waxes having the desired properties may, however, also be employed, as for example tallow, beeswax, candelilla wax, ceresin wax, Japan wax, spermaceti, myrtle wax and the like. Synthetic waxes such as silicones and the like may also be employed. In general, the waxy material should preferably have a solidifying point of about 30 to 75 deg. C., particularly when the wax is applied to the particles of ferrocyanide in molten form, since higher temperatures would, depending on the duration of treatment, have a tendency to drive off the water of crystallization from the additive crystals and leave a powder not readily susceptible to coating in accordance with the requirements of the instant invention.

The preferred process for coating the ferrocyanide particles comprises treating such particles with the required amount of waxy material in molten form and then allowing the waxy material to cool in situ. A thin, continuous or discontinuous coating is thus formed on the particles in such manner that their leaching rate in the presence of salt particles is greatly reduced and the ferrocyanide is released in the presence of the water or brine over a greatly extended period of time to exert its desired anti-caking action in the salt composition. This preferred process may be carried out by spraying the molten waxy material on the crystals of ferrocyanide, preferably also heated, or by intimately mixing the waxy material in grated, flaked or other finely divided form with the said crystals and then applying heat for a sufficient length of time to raise the temperature above the melting point of the waxy material but not above the temperature of dehydration of such crystals (e.g., 70 deg. C. for potassium ferroycanide, 80 deg. C. for sodium ferrocyanide, etc.).

The importance of carrying out the coating process in the proper manner is emphasized by the fact that the desired reduction in leaching rate in not obtained when applying the waxy material to the additive crystals from an organic solvent solution, since the waxy material (e.g. paraffin, stearic acid and its derivatives, cetyl alcohol, etc.) comes out of solution in the cold as discrete particles instead of as a film or coating on the additive crystals.

The coated particles of ferrocyanide may then be directly mixed with the particulate salt composition in an amount sufficient to reduce the caking tendency of the salt. Whereas the uncoated particles of ferrocyanide were employed in proportions of about ⅛ to 8 pounds per ton of salt, much larger amounts of the coated particles of the instant invention, such as about ⅛ to 50 pounds per ton of salt, may be made use of for protection against caking over a much greater length of time. To facilitate uniform and thorough distribution of the additive material throughout any given salt bulk, it is preferred to furnish the ultimate user with the coated particles in the form of an admixture with a finely divided, solid inert diluent in proportions of about 1:1 to 1:100 by weight. Such diluent may consist of finely divided limestone, gypsum, wollastonite, or other readily available, economical, inorganic or organic relatively insoluble substance or mixtures thereof. The particles of diluent should preferably have a size approximating that of the coated particles to minimize settling and segregation. Thus, for example, a pound or so of the coated ferrocyanide may be mixed into a fifty or hundred pound sack of the finely divided diluent whereby the resulting admixture may be readily sprinkled on and/or admixed into the bulk salt by the user.

A further unexpected and improved result of the instant invention resides in the tendency of the coated particles of ferrocyanide to resist dehydration, in addition to settling and segregation in the particulate salt composition, whereby the attainment of optimum results with respect to protection against caking, resistance to leaching and the like, is enhanced.

The following comparative examples or experiments serve to establish the improved and unexpected results of the instant invention. The apparatus employed consists of an overhead brine supply feeding at a constant rate to a manifold supplying 2″ diameter glass tubes, 9″ long, clamped vertically side by side. Each has a bottom stopper with a capillary tube outlet. A plug of glass wool supports 100 grams of rock salt. The test sample of anti-caking additive is dispersed on this, then 50 grams of rock salt are placed on the sample and rubber stopper with a glass tube inlet. Brine flow is controlled by the capillary outlet and is designed to pass 5 cc. per minute through each tube (equivalent to a rainfall of 6″ per hour) by adjusting a pinchcock on the outlet of the brine reservoir.

The test is run in two parts. First, the brine is run in to a depth of ½″, to form a seal, and the inlet stopper is tightly placed on top of the tube. The brine then drops on the rock salt to simulate rain trickling through a pile of rock salt. When no further indication of sodium ferrocyanide is observed, the second part of the test is initiated by filling each tube with brine to a level above the salt column and continuing the brine flow until there is no further indication of ferrocyanide coming through. The inlets of each tube are then closed by a pinchcock. The brine will be held in the tube by atmospheric pressure and the outlets can be observed for evidence of flaky, fluffy or powdery salt formation indicating the presence of an effective amount of ferrocyanide. This will be apparent in a few hours but overnight the indication will be more marked.

The outlet capillaries are then washed with distilled water and the brine flow again initiated with periodic testing of the effluent. This can be repeated until the control tube containing uncoated sodium ferrocyanide shows no further evidence of ferrocyanide. The test is concluded by dumping the contents of each tube, after draining, into a large Petri dish, mixing each by hand and allowing to air dry.

The effluents of the tubes are tested for the presence of ferrocyanide by picking up a drop on a clean glass stirring rod and touching it to a dry filter paper disc treated with ferric chloride. A positive test is indicated by a blue spot at the point of application.

Another indication is the formation of the flaky salt at the outlet capillaries after standing. This is most marked with samples retaining the ferrocyanide. An extensive fluffy-white growth will cover the outlet tube even when the effluent had tested negatively with the ferric chloride paper.

The final indication is apparent in the air dried tube contents. The salt which had the untreated sodium ferrocyanide, in every case, hardened to a solid mass, whereas the ones with effectively coated sodium ferrocyanide all had a film of flaky salt on the surface and were loose and dry.

The following table shows the results of a test in accordance with the above procedure comparing the leaching rate and anti-caking action of equal amounts (0.3 gram) of untreated sodium ferrocyanide and paraffin coated sodium ferrocyanide prepared by mixing the sodium ferrocyanide with 2% by weight of grated candle paraffin wax, M. Pt. 49 deg. C., and heating to about 52 deg. C. to melt the wax in situ. The brine flow rate was 5 cc. per minute, and Retsof #2 rock salt was employed.

Table

|  | Time, minutes | Untreated | Paraffin coated |
|---|---|---|---|
| Part I | 5 | ⊕ | + |
|  | 10 | ⊕ | + |
|  | 15 | ⊕ | + |
|  | 20 | + | + |
|  | 25 | + | + |
|  | 30 | + | + |
|  | 45 | + | + |
|  | 60 | − | + |
| Part II | 5 | + | + |
|  | 10 | − | + |
|  | 20 | − | + |
|  | 30 | − | + |
|  | 60 | − | + |

FLOW STOPPED OVERNIGHT

| Test continued | 1 | + | ⊕ |
|---|---|---|---|
|  | 5 | + | + |
|  | 10 | − | + |

FLOW STOPPED, TUBES DRAINED & AIR DRIED ONE HOUR

| Test continued | 1 | − | + |
|---|---|---|---|
|  | 5 | − | + |
|  | 10 | − | + |

FLOW STOPPED OVERNIGHT

| Test continued | 1 | − | + |
|---|---|---|---|
|  | 5 | − | + |
|  | 10 | − | + |

NOTE.—⊕ = heavy blue stain; + = blue stain; − = no stain.

The above table shows that whereas untreated sodium ferrocyanide is leached relatively rapidly from the rock salt, the leaching or solubility rate of the coated sodium ferrocyanide is very effectively reduced. There is a slow release of ferrocyanide to the brine flow in both part one and part two of the leaching test. Flaky salt forms at the tube outlet and the air dried salt at the expiration of the test is covered with a film of flaky, fluffy salt and is completely loose and dry. This reduction in leaching rate is unobtainable with admixtures of the sodium ferrocyanide with polyvinylpyrrolidone, carboxymethyl cellulose, starch, glue, gelatine, gelatine plus alum, Blancol, powdered stearic acid and paraffin, or with sodium ferrocyanide carrying paraffin, cetyl alcohol, or stearic acid and its derivatives as deposited from organic solvent solution. Acceptable results are however obtained with waxy materials in accordance with the instant invention as described hereinabove, including other mineral, hydrocarbon waxes such as microcrystalline mineral wax.

As a practical illustration, 9.8 pounds of sodium ferrocyanide crystals are mixed with 0.2 pound of grated paraffin wax, M. Pt. 46 deg. C., and the resulting admixture heated in an oven to 49 deg. C. to melt the wax in situ. The admixture is then taken from the oven, allowed to cool, and the resulting 10 pounds of coated ferrocyanide particles intimately mixed with 10 pounds of finely divided wollastonite. This mixture is spread on the peak of a 10 ton outdoor pile of Retsof CC rock salt and lightly raked into the surface of the pile. A similar 10 ton pile of rock salt is similarly treated with 20 pounds of a 1:1 untreated sodium ferrocyanide-wollastonite mix, as a control. The control begins to cake much sooner than the salt pile treated in accordance with the instant invention, indicating a much faster leaching rate.

In the above examples, the sodium ferrocyanide had the following particle size distribution:

17.3% was retained on a #20 mesh screen
28.0% was retained on a #40 mesh screen
20.0% was retained on a #60 mesh screen
24.0% was retained on a #100 mesh screen
9.5% was retained on a #200 mesh screen
1.0% was retained on a #325 mesh screen
0.2% passed through a #325 mesh screen A finer or coarser grind than found in the above sample would also be operative. This inveniton has been disclosed with respect to certain preferred embodiments, and various modifications and variations thereof will become obvious to the worker skilled in the art. It is to be understood that such modifications and variations are to be included within the spirit and scope of the instant invention.

We claim:

1. A process comprising treating particles of a compound selected from the group consisting of ammonium ferrocyanide, alkali metal ferrocyanides and alkaline earth metal ferrocyanides with about 0.5 to 6% by weight of a water insoluble normally waxy material in molten form, allowing the waxy material to cool in situ as a coating on the particles of said compound, and then admixing the resulting coated particles of said compound with sodium chloride particles having a tendency to cake, in an amount sufficient to reduce the tendency of said sodium chloride particles to cake.

2. A process as defined in claim 1 in which said compound is sodium ferrocyanide.

3. A process as defined in claim 2 in which said waxy material is paraffin wax.

4. A process comprising treating particles of a compound selected from the group consisting of ammonium ferrocyanide, alkali metal ferrocyanides and alkaline earth metal ferrocyanides with about 0.5 to 6% by weight of a water insoluble normally waxy material in molten form, allowing the waxy material to cool in situ as a coating on the particles of said compound, mixing the resulting coated particles of said compound with a finely divided solid inert diluent in proportions of about 1:1 to 1:100 by weight, and then admixing the resulting mixture of coated particles and inert diluent with sodium chloride particles having a tendency to cake, in an amount sufficient to reduce the tendency of said sodium chloride particles to cake.

5. A process as defined in claim 4 in which said compound is sodium ferrocyanide.

6. A process as defined in claim 5 in which said waxy material is paraffin wax.

7. A composition produced by a process comprising the steps of treating particles of a compound selected from the group consisting of ammonium ferrocyanide, alkali metal ferrocyanides and alkaline earth metal ferrocyanides with about 0.5 to 6% by weight of a water insoluble normally waxy material in molten form, allowing the waxy material to cool in situ as a coating on the particles of said compound, and admixing the resulting coated particles of said compound with sodium chloride particles having a tendency to cake, in an amount sufficient to reduce the tendency of said sodium chloride particles to cake.

(References on following page)

References Cited in the file of this patent

UNITED STATES PATENTS

| | | |
|---|---|---|
| 1,663,082 | Houghton | Mar. 20, 1928 |
| 1,924,401 | Gilleo | Aug. 29, 1933 |
| 2,288,409 | Lippman et al. | June 30, 1942 |
| 2,326,984 | Tomlin | Aug. 17, 1943 |
| 2,500,770 | Pierce | Mar. 14, 1950 |
| 2,523,420 | Burrage | Sept. 26, 1950 |
| 2,866,760 | Haessler et al. | Dec. 30, 1958 |
| 2,879,133 | Marti | Mar. 24, 1959 |

FOREIGN PATENTS

| | | |
|---|---|---|
| 359,163 | Great Britain | Oct. 22, 1931 |
| 575,617 | Great Britain | Feb. 26, 1946 |
| 752,582 | Great Britain | July 11, 1956 |